United States Patent
Croft

(10) Patent No.: US 7,348,997 B1
(45) Date of Patent: Mar. 25, 2008

(54) OBJECT SELECTION IN A COMPUTER-GENERATED 3D ENVIRONMENT

(75) Inventor: Bryan L. Croft, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 537 days.

(21) Appl. No.: 10/895,675

(22) Filed: Jul. 21, 2004

(51) Int. Cl.
*G06T 15/00* (2006.01)

(52) U.S. Cl. ..................................... 345/629

(58) Field of Classification Search ............... 345/556, 345/628, 629; 382/128
See application file for complete search history.

(56) References Cited

U.S. PATENT DOCUMENTS

| | | | | |
|---|---|---|---|---|
| 4,982,345 A | * | 1/1991 | Callahan et al. ............ | 345/628 |
| 5,289,576 A | * | 2/1994 | Gibbons et al. ............. | 345/556 |
| 5,371,514 A | * | 12/1994 | Lawless et al. ............. | 345/629 |
| 5,757,358 A | | 5/1998 | Osga | |
| 6,246,784 B1 | * | 6/2001 | Summers et al. ........... | 382/128 |

OTHER PUBLICATIONS

Foley et al., "Computer Graphics Principles and Practice", 1996, Addison-Wesley, pp. 240, 241, 338, 339.*

* cited by examiner

*Primary Examiner*—Almis R. Jankus
(74) *Attorney, Agent, or Firm*—Peter A Lipovsky; Allan Y. Lee; J. Eric Anderson

(57) ABSTRACT

An object selection of 3D objects in a computer-generated 3D environment method and system. The method includes defining a 3D space in a computer-generated environment. The method further includes identifying a plurality of 3D objects within the 3D space. Then, determining a line of selection though the 3D space. Further, determining a closet object of the plurality of 3D objects via comparative measurements between the plurality of 3D objects and the line of selection. In addition, enabling the closest object to be selected.

16 Claims, 2 Drawing Sheets

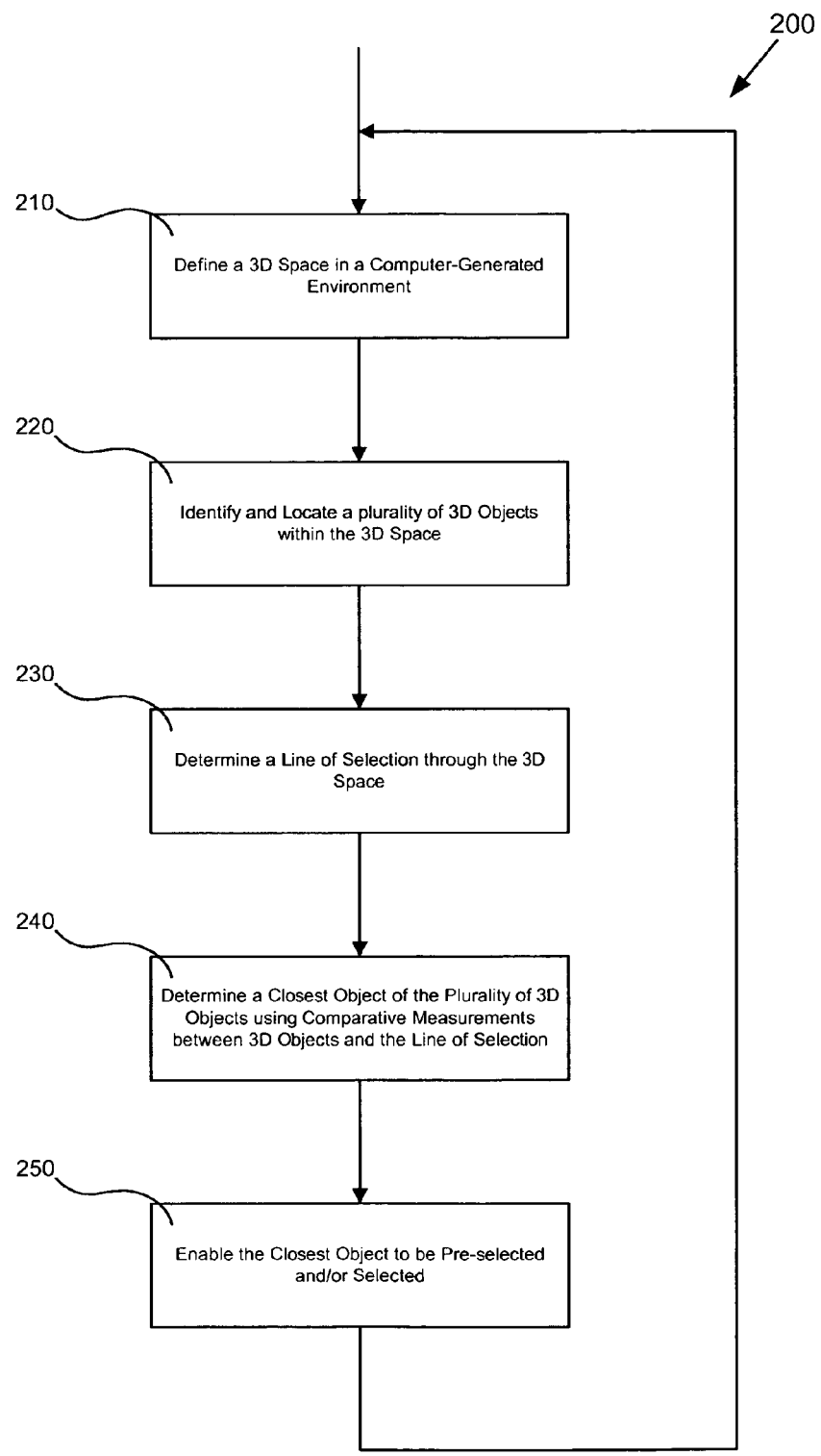

OBJECT SELECTION IN A COMPUTER-GENERATED 3D ENVIRONMENT

BACKGROUND OF THE INVENTION

The present invention is generally in the field of 3D computer-generated environments.

Typical object selection techniques in 3D computer-generated environments use intersection testing to select and/or pre-select objects, which requires intersection of a selection device (e.g., computer cursor) and a selected 3D object.

A need exists for an object selection technique in 3D computer-generated environments that is computationally quick, provides auto-selection and pre-selection without exact placement of selection device and can easily select relatively small objects.

BRIEF DESCRIPTION OF THE DRAWINGS

FIG. 2 is a flowchart of one embodiment of the present invention.

DETAILED DESCRIPTION OF THE INVENTION

Figure 1:
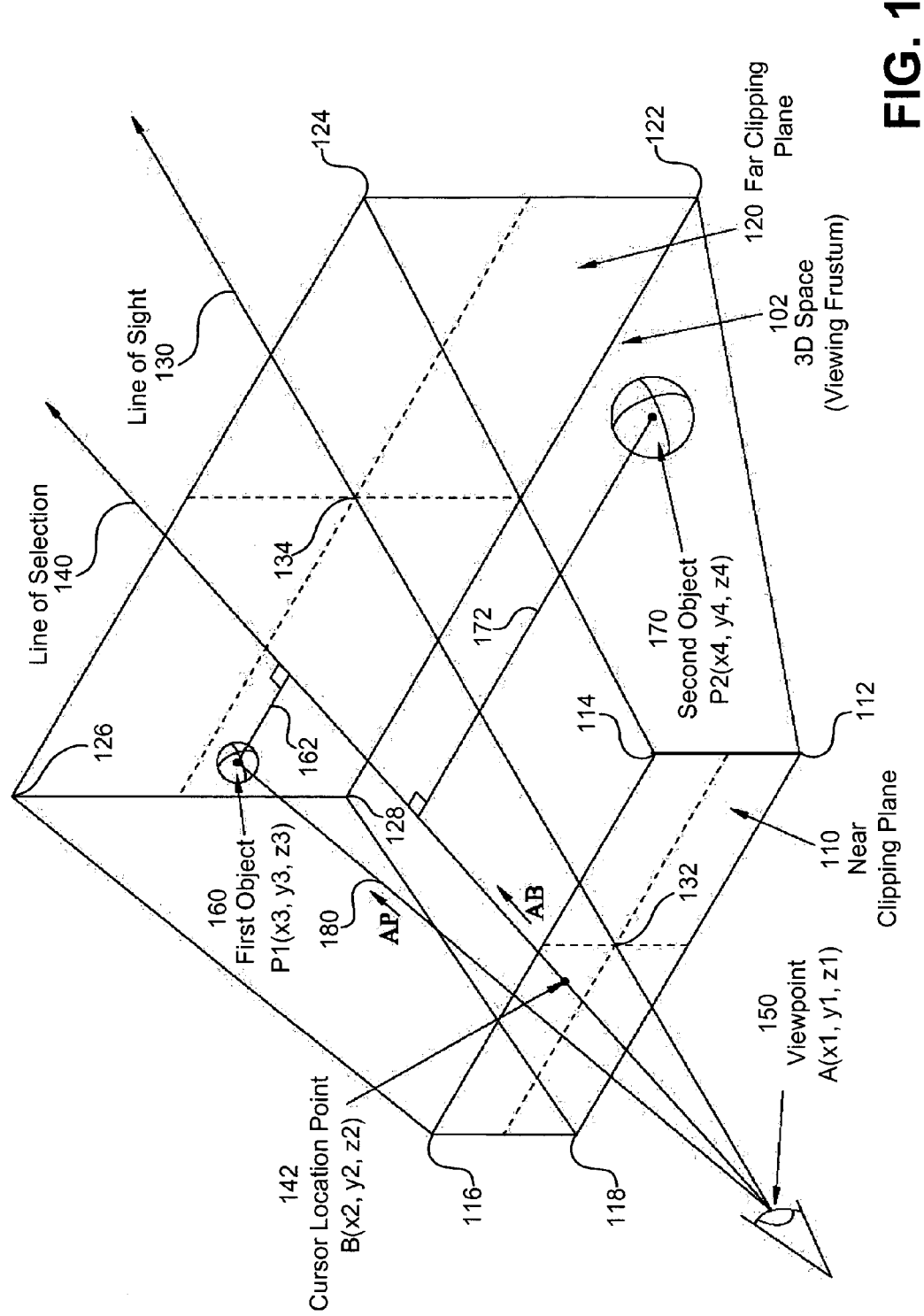
FIG. 1 is a perspective view of an exemplary embodiment of the present invention.

The present invention is directed to object selection techniques in a computer-generated environment. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

DEFINITIONS

The following definitions and acronyms are used herein:

Acronym(s):

3D —Three Dimensional

CG—Computer Generated

Definition(s):

3D Object—Three-Dimensional computer-generated selectable entity.

3D Space—Three-Dimensional computer-generated volume, which is viewable.

Line of Selection—a line formed from a viewpoint and a cursor location point on a display device Near Clipping Plane—plane representing a boundary of a 3D Space that is closest to a viewpoint.

Far Clipping Plane—plane representing a boundary of a 3D Space that is farthest from a viewpoint.

Viewing Space—same as 3D Space.

Viewing Frustum—a defined type of 3D Space, which represents the viewing space.

The present inventive object selection in a 3D computer-generated (CG) environment technique enables selection of a 3D object in a 3D CG environment via a line of selection and comparative measuring of 3D objects. In one embodiment, the present invention allows non-precise movement of a detection pointer (e.g., cursor) for pre-selection and selection. In one embodiment, the present invention is tolerant to selection difficulties such as distant, overlapping and small objects. In one embodiment, the present invention is computationally quick.

3D CG environments include 3D objects and a viewable volume or space. 3D objects situated within the viewable volume can be viewed by end users. Conversely, 3D objects situated outside the viewable volume cannot be viewed by end users. Typical 3D CG systems that generate 3D CG environments include a computer operatively coupled to a display device and user interface. Exemplary display devices include computer monitors and televisions. Exemplary user interfaces include keyboards, joysticks, mouse pointers and trackballs. End users can change position and orientation of the viewable space and select objects via user interfaces.

FIG. 1 is a perspective view of an exemplary embodiment of the present invention. As shown in FIG. 1, 3D space 102 defines the volume that an end user can view. In the embodiment of FIG. 1, 3D space 102 has a frustum configuration. Those skilled in the art shall recognize that 3D space 102 can have different configurations such as partial circular cones and partial elliptical cones without departing from the scope and spirit of the present invention. 3D space 102 can be defined by a volume within points 112, 114, 116, 118, 122, 124, 126, 128. 3D space 102 can also be defined by a volume within near clipping plane 110, far clipping plane 120 and planes formed by connecting corresponding corners of near clipping plane 110 and far clipping plane 120. Near clipping plane 110 includes points 112, 114, 116, 118. Far clipping plane 120 includes points 122, 124, 126, 128. The remaining planes of 3D space 102 include plane formed by points 114, 124, 126, 116; plane formed by points 112, 122, 124, 114; plane formed by points 112, 122, 128, 118; and plane formed by points 118, 128, 126, 116. In one embodiment, near clipping plane 110 and far clipping plane 120 are represented by a two-dimensional surface such as a computer monitor screen.

Objects within 3D space 102 can be viewed by end users. Objects such as first object 160 and second object 170 can be referenced by, for example, centroid points or other pre-defined locations. As shown in FIG. 1, first object 160 and second object 170 are within 3D space 102. Near clipping plane center point 132 and far clipping plane center point 134 form line of sight 130. Viewpoint 150 is an imaginary point along the line of sight 130 where end users can view 3D space 102. Viewpoint 150 and cursor location point 142 form line of selection 140. As described below with reference to FIG. 2, pre-selection or enablement of selection uses comparative measurements between objects (e.g., first object 160 and second object 170) and line of selection 140. In one embodiment, comparative measurements are obtained from orthogonal (i.e., perpendicular or normal) lines from objects to line of selection 140. For example, first object line segment 162 is an orthogonal line segment between first object 160 and line of selection 140; and second object line segment 172 is an orthogonal line segment between second object 170 and line of selection 140.

FIG. 2 is a flowchart of an exemplary method of implementing an embodiment of the present invention. Certain details and features have been left out of flowchart 200 of FIG. 2 that are apparent to a person of ordinary skill in the art. For example, a step may consist of one or more sub-steps or may involve specialized equipment or materials, as known in the art. While STEPS 210 through 250 shown in flowchart 200 are sufficient to describe one embodiment of the present invention, other embodiments of the invention may utilize steps different from those shown in flowchart 200.

Referring to FIG. 2, at STEP 210 in flowchart 200, the method defines a 3D space in a computer-generated environment. In one embodiment, a 3D space is a frustum defined by eight points, which form a near clipping plane and a far clipping plane. As described above with reference to FIG. 1, 3D space 102 is defined by points 112, 114, 116, 118, 122, 124, 126, 128, which form near clipping plane 110 and far clipping plane 120. In one embodiment, the 3D space is represented on a display device such as, for example, a computer monitor screen. In one embodiment, end users can change position and orientation of the 3D space. After STEP 210, the method of flowchart 200 of FIG. 2 proceeds to STEP 220.

At STEP 220 in flowchart 200, the method identifies a plurality of 3D objects within the 3D space. In one embodiment, the method at STEP 220 first determines the number of 3D objects that are situated within the 3D space prior to identifying the plurality of 3D objects. If only one 3D object is situated within the 3D space, the method enables selection of the sole object. If no 3D objects are situated within the 3D space, the method does not select or pre-select objects. In one embodiment, the method at STEP 220 identifies and locates all objects within the 3D space. In one embodiment, the method at STEP 220 obtains a listing of all objects within the 3D space. In one embodiment, the method at STEP 220 obtains a listing of all objects within the 3D space and corresponding location points of objects. In one embodiment, the method at STEP 220 obtains a listing of all objects within the 3D space and corresponding centroid points of objects. As described above with reference to FIG. 1, first object 160 and second object 170 are situated within 3D space 102. After STEP 220, the method proceeds to STEP 230.

At STEP 230 in flowchart 200, the method determines a line of selection, which passes through the 3D space. In one embodiment, the line of selection is formed from a viewpoint and a cursor location point on a display device such as a computer monitor screen. As described above with reference to FIG. 1, line of selection 140 is formed from viewpoint 150 and cursor location point 142. After STEP 230, the method of flowchart 200 of FIG. 2 proceeds to STEP 240.

At STEP 240 in flowchart 200, the method determines a closest object of the plurality of 3D objects using comparative measurements between 3D objects and the line of selection. In one embodiment, the method at STEP 240 in flowchart 200 includes the following sub-steps: (a) for each 3D object within 3D space, obtain distance between 3D object and closest point on line of selection; (b) compare ratios between distances for each object to determine smallest distance, which corresponds to the object closest to the line of selection. In one embodiment of sub-step (a) of STEP 240, the method uses an orthogonal line between 3D objects and the line of selection to determine distances between 3D objects and the line of selection.

In a dot product embodiment of sub-step (a) of STEP 240, the method uses the vector geometry mathematical property of two vectors being perpendicular if and only if their dot product equals zero. For example, referring again to FIG. 1, first object line segment 162, which is an orthogonal line segment between first object 160 and line of selection 140, can be determined by the following pseudo-code:

i) Determine two points (e.g., a first point and an second point) that define line of selection 140 in 3D space 102 (e.g., viewpoint 150 having Cartesian coordinates A(x1, y1, z1) and cursor location point 142 having Cartesian coordinates B(x2, y2, z2))

ii) Determine a location point associated with the location of a selected 3D object (e.g., first object 160 having Cartesian coordinates P1(x3, y3, z3))

iii) Determine a vector that defines line of selection 140 (i.e., selection vector) (e.g., vector AB, which can be represented by the following equation:

$$AB=[(c2-x1), (y2-y1), (z2-z1)]$$

iv) Determine a vector that defines a line from a common point (e.g., viewpoint 150) to the point associated with the location of the selected 3D object (i.e., 3D object vector) (e.g., vector AP 180, which can be represented by the following equation: AP=[(x3−x1), (y3−y1), (z3−z1)])

v) Determine "L", the length of the dot product of the above-referenced vectors (e.g., vector AB and vector AP), which can be represented by the following equation: L=[(x3−x1)(x2−x1)+(y3−y1)(y2−y1)+(z3−z1)(z2−z1)]

vi) Determine "|AB|" and "|AP|", distance or magnitude of vectors AB and AP, which can be represented by the following equations:

$$|AB|=\sqrt{(x2-x1)^2+(y2-y1)^2+(z2-z1)^2};$$

$$|AP|=\sqrt{(x3-x1)^2+(y3-y1)^2+(z3-z1)^2}$$

vii) Determine "D", a minimum distance (i.e., orthogonal) between the selected 3D object and line of selection 140, which can be represented by the following equation:

$$D|AP|\sin\left[\text{invCos}\left(\frac{L}{|AP||AB|}\right)\right]$$

The method repeats the above pseudo-code steps (i)-(vii) for each 3D object within the 3D space.

In a cross product embodiment of sub-step (a) of STEP 240, the method uses the mathematical property that a perpendicular between an object and a selected vector (e.g., line of selection) can be obtained from the length of the cross products of vectors originating from a common point (e.g., viewpoint 150) divided by the length of the selected vector. For example, referring again to FIG. 1, first object line segment 162, which is an orthogonal line segment between first object 160 and line of selection 140, can be determined by the following pseudo-code:

i) Determine two points (e.g., a first point and an second point) that define line of selection 140 in 3D space 102 (e.g., viewpoint 150 having Cartesian coordinates A(x1, y1, z1) and cursor location point 142 having Cartesian coordinates B(x2, y2, z2))

ii) Determine a location point associated with the location of a selected 3D object (e.g., first object 160 having Cartesian coordinates P1(x3, y3, z3))

iii) Determine a vector that defines line of selection 140 (i.e., selection vector) (e.g., vector AB, which can be represented by the following equation:

$$AB=[(c2-x1), (y2-y1), (z2-z1)]$$

iv) Determine a vector that defines a line from a common point (e.g., viewpoint 150) to the point associated with the location of the selected 3D object (i.e., 3D object vector) (e.g., vector AP 180, which can be represented by the following equation: AP=[(x3-x1), (y3-y1), (z3-z1)])

v) Determine "L", the length of the cross product of the above-referenced vectors (e.g., vector AB and vector AP), which can be represented by the following equation: L=Sqrt{[(y2-y1)(z3-z1)-(z2-z1)(y3-y1)]^2+ [(x2-x1)(z3-z1)-(x3-x1)(z2-z1)]^2+[(x2-x1)(y3-y1)-(x3-x1)(y2-y1)]^2} vi) Determine "|AB|", a distance between two points that define line of selection 140 (i.e., LOS distance) (e.g., viewpoint 150 and cursor location point 142), which can be represented by the following equation:

$$|AB|=\sqrt{(x2-x1)^2+(y2-y1)^2+(z2-z1)^2}$$

vii) Determine "D", a minimum distance (i.e., orthogonal) between the selected 3D object and line of selection 140, which can be represented by the following equation:

$$D = \frac{L}{|AB|}.$$

The method repeats the above pseudo-code steps (i)-(vii) for each 3D object within the 3D space.

In a triangle relationship embodiment of sub-step (a) of STEP 240, the method uses three vectors that form a triangle having points along a line of selection and a selected 3D object. In one embodiment, the method uses the following three vectors: a vector that defines line of selection 140 (e.g., vector AB), a vector that defines a line from a common point to the point associated with the location of the selected 3D object (e.g., vector AP) and a vector that defines a line from a point on line of selection 140 other than the common point and the point associated with the location of the selected 3D object. The triangle relationship embodiment of sub-step (a) of STEP 240 uses these three vectors along with the law of cosines and the properties of right triangles to solve for the smallest distance between objects.

In a dot product embodiment of sub-step (b) of STEP 240, the method compares ratios of distances obtained from sub-step (a) to determine a smallest distance, which corresponds to the object closest to the line of selection.

In a cross product embodiment of sub-step (b) of STEP 240, the method compares ratios between distances obtained from sub-step (a) to determine a smallest distance, which corresponds to the object closest to the line of selection. In one embodiment, the method compares each 3D object within the 3D space according to the following pseudo-code:

viii) Obtain ratio between two selected objects, which can be represented by the following equation:

$$\frac{D1}{D2} = \frac{(L1 \times |AB|)}{(L2 \times |AB|)},$$

where D1 is the minimum distance between the first selected object and line of selection 140; D2 is the minimum distance between the second selected object and line of selection 140; L1 is the length of the cross product of the first selected object; and L2 is the length of the cross product of the first selected object.

ix) associating the first selected object as the closest object if D1/D2<1.0, which signifies that D1 is smaller than D2.

x) Repeat STEPS (viii) through (ix) for each 3D object within the 3D space.

In accordance with one embodiment the present invention, calculations are greatly reduced due to the use of ratio comparison.

In a triangle relationship embodiment of sub-step (b) of STEP 240, the method compares ratios between distances obtained from sub-step (a) to determine a smallest distance, which corresponds to the object closest to the line of selection.

STEP 240 in flowchart 200 determines a closest object of the plurality of 3D objects using the above-described methodology. After STEP 240, the method of flowchart 200 of FIG. 2 proceeds to STEP 250.

At STEP 250 in flowchart 200, the method enables the closest object to be pre-selected and/or selected. In one embodiment of STEP 250, the method pre-selects the closest object. In one embodiment of STEP 250, the method enables the next closest object to be selected if the closest object is currently selected. In one embodiment of STEP 250, the method enables selection of multiple objects based on filtered settings. After STEP 250, the method of flowchart 200 of FIG. 2 returns to STEP 210.

In one embodiment, the method of flowchart 200 of FIG. 2 is performed once per refresh. For example, the method is performed 60 times a second when a display device has a 60 Hz refresh rate. In one embodiment, the method of flowchart 200 of FIG. 2 is performed dependent upon an event or events. For example, the method is performed when an object moves or the 3D space changes position or orientation.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

I claim:

1. A method for object selection of 3D objects in a computer-generated 3D environment, the method comprising the steps of:

a) defining a 3D space in a computer-generated environment;

b) identifying a plurality of 3D objects within said 3D space, comprising the sub-steps of:
   i) determining how many of said plurality of 3D objects are within said 3D space;
   ii) enabling selection of a sole 3D object if only one 3D object is within said 3D space;
   iii) disabling selection of 3D objects if no 3D objects are within said 3D space;
   iv) obtaining a listing of all 3D objects within said 3D space;
c) determining a line of selection though said 3D space;
d) determining a closest object of said plurality of 3D objects via comparative measurements between said plurality of 3D objects and said line of selection;
e) enabling said closest object to be selected;
f) returning to said defining said 3D space STEP (a).

2. A method for object selection of 3D objects in a computer-generated 3D environment, the method comprising the steps of:
   a) defining a 3D space in a computer-generated environment;
   b) identifying a plurality of 3D objects within said 3D space and obtaining a listing of all 3D objects within said 3D space and a listing of location points of all 3D objects within said 3D space;
   c) determining a line of selection through said 3D space;
   d) determining a closest object of said plurality of 3D objects via comparative measurements between said plurality of 3D objects and said line of selection;
   e) enabling said closest object to be selected;
   f) returning to said defining said 3D space STEP (a).

3. The method of claim 2, wherein said determining said closet object STEP (d) uses a dot product technique.

4. The method of claim 2, wherein said determining said closet object STEP (d) uses a cross product technique.

5. The method of claim 2, wherein said determining said closet object STEP (d) uses a triangle relationship technique.

6. The method of claim 2, wherein said determining said closet object STEP (d) comprises the following sub-steps:
   i) obtaining distances between each 3D object and a closest point to said line of selection;
   ii) comparing ratios between distances for each 3D object to determine a smallest distance, wherein said smallest distance is associated with said closest object.

7. The method of claim 6, wherein said obtaining distances between each 3D object and a closest point to said line of selection sub-step (i) comprises the following sub-steps:
   (1) determining a first point and a second point that define said line of selection;
   (2) determining a location point associated with a selected 3D object
   (3) determining a selection vector that defines said line of selection;
   (4) determining a 3D object vector;
   (5) determining a length (L) of a cross product of said selection vector and said 3D object vector;
   (6) determining a LOS distance (|AB|);
   (7) determining a minimum distance (D) between said selected 3D object and said line of selection;
   (8) repeating STEPS (1)-(7) for each 3D object within said 3D space.

8. The method of claim 7, wherein said determining said length (L) SUB-STEP (5) uses the following equation:
L=Sqrt{[(y2−y1)(z3−z1)−(z2−z1)(y3−y1)]^2+[(x2−x1)(z3−z1)−(x3−x1)(z2−z1)]^2+[(x2−x1)(y3−y1)−(x3−x1)(y2−y1)]^2}.

9. The method of claim 7, wherein said determining said LOS distance (|AB|) SUB-STEP (6) uses the following equation: $|AB|=\sqrt{(x2-x1)^2+(y2-y1)^2+(z2-z1)^2}$.

10. The method of claim 7, wherein said determining said minimum distance (D) SUB-STEP (7) uses the following equation:

$$D = \frac{L}{|AB|}.$$

11. The method of claim 6, wherein said comparing ratios between distances for each 3D object to determine said smallest distance sub-STEP (ii) comprises the following sub-steps:
   (1) obtaining a ratio between a first selected 3D object and a second selected 3D object;
   (2) associating said first selected 3D object as said closest object;
   (3) repeating STEPS (1)-(2) for each 3D object within said 3D space.

12. The method of claim 11, wherein said obtaining said ratio SUB-STEP (1) uses the following equation:

$$\frac{D1}{D2} = \frac{(L1 \times |AB|)}{(L2 \times |AB|)}.$$

13. The method of claim 2, wherein said enabling said closest object to be selected STEP (d) comprises enabling a next closest object to be selected if the closest object is currently selected.

14. The method of claim 2, wherein said enabling said closest object to be selected STEP (e) comprises enabling selection of multiple 3D objects based on filtered settings.

15. The method of claim 2, wherein said returning STEP (f) occurs once per refresh.

16. The method of claim 2, wherein said returning STEP (f) occurs once per selected event.

* * * * *